Figure 1:
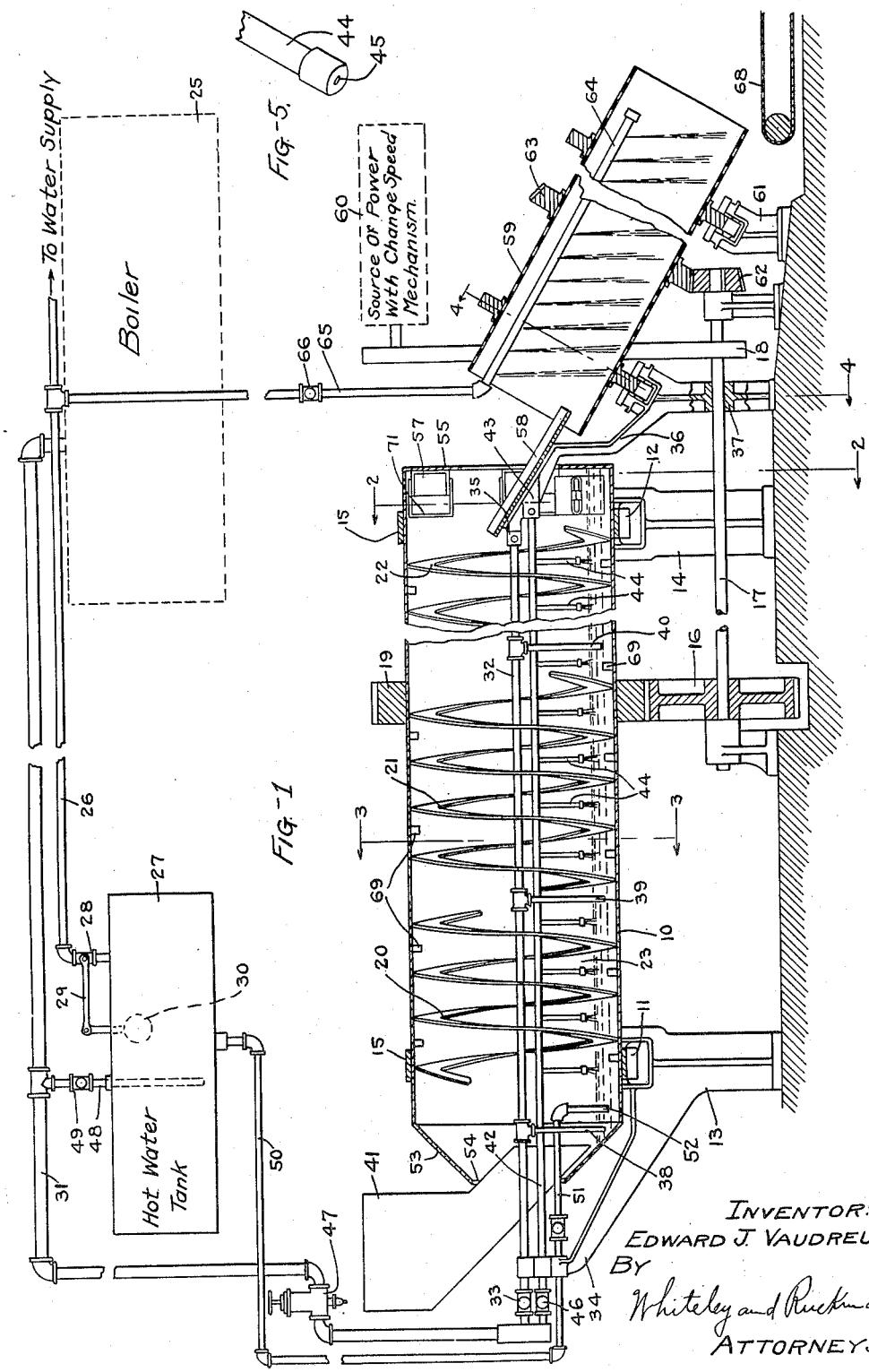

E. J. VAUDREUIL.
APPARATUS FOR BLANCHING OR COOKING VEGETABLES.
APPLICATION FILED FEB. 23, 1921.

1,374,340.

Patented Apr. 12, 1921.
2 SHEETS—SHEET 1.

INVENTOR:
EDWARD J. VAUDREUIL.
BY
Whiteley and Ruckman
ATTORNEYS.

E. J. VAUDREUIL.
APPARATUS FOR BLANCHING OR COOKING VEGETABLES.
APPLICATION FILED FEB. 23, 1921.

1,374,340.

Patented Apr. 12, 1921.

2 SHEETS—SHEET 2.

INVENTOR:
EDWARD J. VAUDREUIL.
By Whiteley and Ruckman
ATTORNEYS.

UNITED STATES PATENT OFFICE.

EDWARD J. VAUDREUIL, OF EAU CLAIRE, WISCONSIN.

APPARATUS FOR BLANCHING OR COOKING VEGETABLES.

1,374,340.   Specification of Letters Patent.   Patented Apr. 12, 1921.

Application filed February 23, 1921. Serial No. 446,991.

*To all whom it may concern:*

Be it known that I, EDWARD J. VAUDREUIL, a citizen of the United States, residing at Eau Claire, in the county of Eau Claire and State of Wisconsin, have invented certain new and useful Improvements in Apparatus for Blanching or Cooking Vegetables, of which the following is a specification.

My invention relates to apparatus for blanching or cooking vegetables such as peas, beans for baked beans, string beans, etc. This blanching or cooking is an essential step in the preparation of such vegetables for canning. In canneries where such cooking or blanching takes place on a large scale great difficulty has been experienced in obtaining blanching results with sufficient capacity and effective cooking and at the same time not contaminating the vegetables. As now practised such contamination invariably takes place for the reason that the hot water in which the vegetables are cooked or blanched becomes foul with the juices and loose detritus of the vegetables. The vegetables in cooking swell and absorb a certain percentage of the water in which they are cooked. If this water is in any respect foul it will enter the body of the vegetables and contaminate them and materially degrade the flavor and quality of the product. In canning peas it has long been customary to attempt to overcome the ill effect of this bad flavor by the use of sugar. This results in the canned product having an entirely different flavor from the natural flavor and in its being not only less palatable but much less wholesome. It is also true that the methods heretofore employed wherein quantities of the product in succession are passed through the same large body of water, have limited the capacity and produced inefficient cooking for the reason that nothing but water has been used in the cooking, which never could be at a higher temperature than the boiling temperature, and for this reason the time required to effect complete and satisfactory cooking is much longer than is necessary with my apparatus, and consequently the amount of vegetables that can be properly cooked in a given time will be less. Furthermore, by the use of live steam under pressure directly impacted upon the vegetables as they travel through the apparatus I am not only enabled to cook the vegetables in less time than by the strictly boiling process, but effect a cooking action which is superior in its results on the product to that which may be obtained by the use of boiling water alone.

It is the object of my invention to provide means for overcoming the objections and effecting the desirable results above enumerated by providing a rotating cylinder with means therein for causing the vegetables to move in a relatively thin and extended sheet or mass from the receiving end to the discharge end of the cylinder subject to the cooking action of water and steam, or steam alone, and moving at such a rate that such cooking action will just effect proper cooking from the time of entrance of the vegetables into the cylinder to their discharge therefrom. Where water is used, as is done in the preferred practice of my invention, I provide means to introduce hot water into the cylinder and discharge it therefrom in an amount proportional to the vegetables entering, moving through and discharging from the cylinder, so that the water in its entirety and throughout the relatively thin and extended body thereof is being changed at a rate proportional to the infeed of said vegetables. It is a further object of my invention to provide means for injecting live stream at a relatively considerable pressure directly into and upon the sheet of moving vegetables for effecting cooking action thereof, and directly into the body of water which may be in the drum at various points along the extent thereof both for direct cooking action of the steam upon the vegetables into which it is impacted, and to heat, and maintain heated, to a temperature at or about the boiling temperature all of the water within the drum or cylinder.

More specifically my invention provides an extended cylinder having therein a spiral passageway with means for introducing vegetables and hot water into one end of the cylinder and for rotating the cylinder so that the spiral passageway will cause the vegetables to move along and with the shallow stream of water from the inlet end of the cylinder to the discharge end thereof, with means at the discharge end for discharging both vegetables and water, and with means for injecting live steam at considerable pressure directly into the water and body of vegetables at various points along the stream, and for impacting blasts of steam upon the vegetables as they tend to rise out of the water or as they are carried along and through the cylinder if no water is used to effect direct cooking of the vegetables by steam action.

The full objects and advantages of my invention will appear in connection with the detailed description thereof and the novel features embodied in my inventive idea will be particularly pointed out in the claims.

In the drawings, illustrating the application of my invention in one form,—

Figure 2:
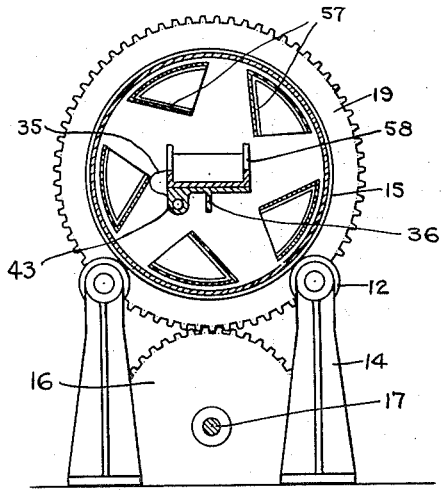
Figure 3:
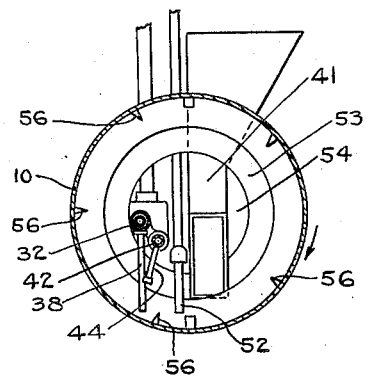
Figure 4:
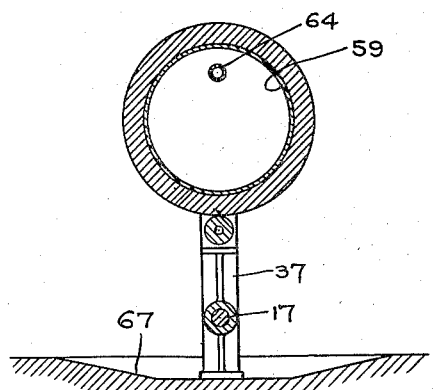

Figure 1 is a side elevation part sectional view of apparatus of my invention with some parts represented diagrammatically. Fig. 2 is a sectional elevation view on the line 2—2 of Fig. 1. Fig. 3 is a transverse sectional elevation view of the cylinder and feed inlets on line 3—3 of Fig. 1. Fig. 4 is a sectional view on line 4—4 of Fig. 1. Fig. 5 is a fragmentary view of a portion of a nozzle showing the outlet for the steam blasts.

In the form of my invention illustrated in the drawings, a drum 10 of sheet metal or wood, or any desired material is maintained in a horizontal position by resting upon rollers 11, 12 journaled in front frame members 13 and rear frame members 14, said rollers engaging rings or bands 15 upon the drum 10. It will be understood that any form of cylinder and any suitable frame device and system of rollers or other means of supporting the drum horizontally for rotary movement may be employed and are within the scope of my invention. For giving the drum or cylinder the desired rotary movement a pinion 16 on a shaft 17 driven by a pulley 18 from any desired source of power may mesh with a spur gear 19 encircling the drum 10, it being understood that the source of power indicated diagrammatically at 60 is provided with change speed mechanism of any well-known type whereby the rate of rotation of the drum 10 may be regulated in any way desired to cause the rotation of the drum to be at a rate just sufficient to carry vegetables and water through the drum and discharge the same after complete cooking has been effected.

Within the drum 10 are a series (here shown as three) of spiral ribs or fins 20, 21, 22 which form a substantially continuous spiral passageway 23 and operate at the bottom of the drum to forward vegetables, or vegetables and water, along said bottom as said vegetables are fed into the drum from the hopper chute 24 at the rear or feed end of the drum. A hot water tank 27 receives water from any suitable source of supply through a pipe 26, the amount of water in the tank being automatically controlled by valve 28, which is operated by an arm 29 actuated by a float 30 within the tank 27 in a well-known way.

This water is heated to boiling by steam from a boiler indicated diagrammatically at 25, which passes from said boiler through a main feed pipe 31 and a branch pipe 32 which is controlled by hand valve 33. The branch pipe 32 extends through the cylinder or drum 10 below and at the side of the cylinder toward which the bottom of said cylinder moves, said pipe 32 being supported at one end by a bracket 34 secured to the supporting standard 13, and at the other end by a boss 35 on a bracket 36 secured to a support 37 hereinafter referred to. The pipe 32 is provided with a plurality of depending leads (here shown as three) 38, 39, 40, which leads extend to points near the bottom of cylinder or drum 10, where live steam at any desired pressure will be injected directly into the vegetables at the bottom of drum 10 and into the shallow body of water moving along the bottom of said drum where water is employed. The lead 38 enters the water at the point where the vegetables are passed into the cylinder from hopper 41 so that said vegetables are immediately subjected to the action of the live pressure steam. In addition to effecting a cooking action upon the vegetables the steam from the leads 39, 40 and 41 keeps the water in the tanks at or near boiling temperature. A second lead 42 extends from steam main 31 through the drum 10, being supported by bracket 34 and a boss 43 on bracket 36. The lead or pipe 42 is provided with a multiplicity of extension pipes or nozzles 44 each having a central aperture 45, as indicated in Fig. 5. The flow of steam through pipe 42 is controlled by hand valve 46. The nozzles 44 are angularly disposed toward that side of the cylinder 10 which from the direction of rotation thereof is the rising side and tends to bring the vegetables to the surface or out of the water which may be in the drum, or to raise the vegetables along the side of the drum. In this manner jets of steam from the nozzles 44 are at desired pressures impacted directly into the exposed vegetables. The delivery pressure of steam from leads 38, 39 and 40, and nozzles 44, is determined by a steam reducing valve 47 placed at a suitable point in the main steam line 31. By this means any pressure not greater than the maximum pressure of the boiler may be obtained. It has been found by experiment that the higher the delivery pressure of the steam the less will be the time required to cook the vegetables, or, stated in other words, a higher steam pressure will make possible increase of the speed of rotation of the drum 10 and an increased rate of movement of the product through the drum and increased capacity. I have found by experiment that where the steam is delivered at thirty pounds pressure twenty minutes will be required for cooking. At forty pounds pressure from fifteen to seventeen minutes will be required. At fifty pounds pressure from ten to twelve minutes will be required. Pressures ranging from thirty to fifty pounds are desirable according to the type of vegetable which is being cooked or parboiled.

The water in tank 27 is kept at boiling temperature by steam which goes from main 31 through a pipe 48 to the bottom of tank 27, being controlled by a hand valve 49. The hot water from tank 27 goes through pipe 50 and an extension 51 therefrom into the drum 10, where a depending leader 52 introduces the water into the cylinder at about the point where the vegetables are introduced into the cylinder from the chute or hopper 41. It is to be noted that the rear end of the cylinder has a conical closure 53 which partly closes the cylinder, leaving a reduced opening 54 through which the chute 41 and steam and water pipes extend. A right-angled flange 55 at the front of the cylinder 10, together with the conical flange 53 maintains the water within the cylinder except as the same is discharged as hereinafter pointed out. The feed of water relative to the rate of rotation of the drum 10, and rate of discharge, will be such as to maintain the water at all times at a slightly lower level than the vertical height of the spiral fins 20, 21 and 22. It will be seen that the boiling water may be fed in any desired quantity continuously into the receiving end of the tank at about the point that the vegetables come in through the chute 41. Fins 20, 21 and 22 are provided with a multiplicity of narrow slit-like openings 56 adjacent the inside wall of the cylinder by which the water introduced in the cylinder may flow continuously in a stream, said openings being of a form and size such as to prevent the passage of vegetables which are constrained to move through the cylinder to the discharge end by the action of the ribs 20, 21 and 22 in a predetermined time just sufficient to produce the desired cooking action before discharge. This is effected, of course, by regulating the speed of rotation of the cylinder in reference to the rate of feed of vegetables and the pressure at which the steam is delivered to the vegetables.

When the vegetables reach the forward or discharge end of the drum 10 they are engaged by buckets 57 secured to said discharge end and inside of the flange 55 on said discharge end. Said buckets take a measured quantity of vegetables and water and discharge the same upon a trough or chute 58 which extends through the central opening within the flange 55, and which is supported upon an extension of bracket member 36. The chute 58 leads inside of a perforate drum 59, which drum is rotatably supported upon the standard 37 and a second standard 61 and is driven by a pinion 62 on shaft 17 which meshes with a gear 63 on the drum 59. Cold water is sprayed from a pipe 64 within drum 59, being supplied by a branch pipe 65 extending from pipe 26 and controlled by a hand valve 66. This cold water together with water discharged from the buckets 36 passes through the perforate drum 59 and upon a drainage surface below the same, indicated at 67 in Fig. 4, from whence said water goes out of the building to the sewer or other drainage channel. The vegetables are finally discharged from drum 59 upon an endless conveyer belt 68, from which they are fed to any desired point for a continuance of the canning operation.

Upon the inside of cylinder 10 and positioned midway of the spiral passageway 23 are a multiplicity of pins or projections 69, which pins or projections coöperate to agitate or stir the vegetables as the pins pass through the mass of vegetables at the bottom of the drum. These vegetables will also, as hereinbefore pointed out, tend to be lifted by the rotation of the drum, and will be subject to the steam blown upon them both directly into them by the leads 38, 39 and 40 and impacted against them from the nozzles 44. It is noted that the lead 38 enters the drum and the vegetables at the point where said vegetables are introduced into the cylinder, quickly heating them to the desired point and preventing cooling of the water where that is used. The leads 39 and 40 extend between the spiral fins 20 and 21, and 21 and 22, respectively, so that the rotation of said fins is not interfered with. The ends of nozzles 44 are brought as close to the vegetables at the bottom of the drum as the height of the fins will permit.

It is to be noted that the buckets 57 preferably are provided with a telescoping portion 71 shown in Fig. 1 with a set-bolt 72 operating in a slide 73 to hold said buckets in adjusted position whereby they may be larger or smaller and discharge a greater or less amount of the cooked vegetables and water as may be desired.

The many advantages of my invention have been quite fully pointed out in connection with the description thereof. It will be understood that the cylinder is caused to revolve quite slowly so that without excessive length the vegetables may be caused to travel at the bottom of the heating chamber within the cylinder at a rate just sufficient so that the time which elapses from the entrance of said vegetables into the water to their discharge from the buckets 57 will be long enough to effect the desired cooking, and no longer. In practice, as above pointed out, I have found this time to vary in accordance with the vegetables employed, and with the pressure of the steam. For vegetables such as string beans with a steam pressure of from thirty to forty pounds, seven minutes is sufficient. For peas the time will be somewhat longer, and for the cooking of navy beans to prepare baked beans, the time will run from ten to twenty minutes according to the pressure employed. The speed regulator devices, diagrammatically indicated at 60, may obviously be employed to vary the speed of rotation of the drum at will, and consequently the length of time required for the vegetables to travel through the drum may be correspondingly varied, and likewise the pressure of steam by means of the pressure reducing valve 47 may be similarly varied, all to effect exactly the right cooking action for any particular vegetable. In general it is preferable to employ water, which will be fed into the drum at a rate proportional to the feed of vegetables into the drum and the rate of rotation thereof and the discharge of water and vegetables from the drum. In certain cases, however, it is desirable to use steam only, when the apparatus will be employed in exactly the same manner as where water is used.

I claim:

1. An apparatus for cooking vegetables comprising a drum, means for introducing water at one end and means for discharging water at the other end of said drum to cause a shallow stream of water to move along the bottom of said drum, means for feeding vegetables into said stream at one end, means for maintaining the temperature of the water at or about the boiling point, means for moving the vegetables along said stream in a predetermined time, and means for discharging the vegetables from the drum and separating them from the stream.

2. An apparatus for cooking vegetables comprising a drum, means for rotating said drum, means for feeding vegetables into and through and from the drum as the drum is rotated, means for introducing hot water at one end and discharging water from the other end of said drum to maintain a moving shallow body of water within the drum, and means for maintaining the temperature of said water at or near the boiling point.

3. An apparatus for cooking vegetables comprising a drum, means for rotating said drum, means for feeding vegetables into the drum, means for moving the vegetables through and from the drum as the drum is rotated, means for introducing hot water at one end and discharging said water from the other end of said drum to maintain a moving shallow body of water within the drum, and means for injecting live steam into said body of water at various points along the length of the same.

4. An apparatus for cooking vegetables comprising a rotating drum with an extended shallow body of water therein, means for feeding vegetables into said drum and body of water at one end thereof, and means for injecting live steam into the water at the point where the vegetables enter the same.

5. An apparatus for cooking vegetables comprising a rotating drum with an extended shallow body of water therein, means for feeding vegetables into said drum and body of water at one end thereof, means for injecting live steam into the water at the point where vegetables enter the same, and means in said rotating drum for causing the vegetables and water to move through the drum in a predetermined period of time.

6. An apparatus for cooking vegetables comprising a rotating drum with an extended shallow body of water therein, means for feeding vegetables into said drum and body of water at one end thereof, means for injecting live steam into the water at the point where the vegetables enter the same, means in said rotating drum for causing the vegetables and water to move through the drum in a predetermined period of time, and means for discharging the water and vegetables in relatively proportional amounts.

7. An apparatus for cooking vegetables comprising a rotating drum, spiral fins in said drum creating a spiral passageway, means for introducing vegetables into the rear end of said spiral passageway, means for introducing hot water into the rear end of said spiral passageway, and means for withdrawing vegetables and water in proportion to the rate of feed of the same from the front end of said spiral passageway and discharging them from the drum.

8. An apparatus for cooking vegetables comprising a rotating drum, means for introducing water at one end of the drum, means for feeding vegetables into the drum at the point where the water is introduced, means for moving said vegetables and water along and through the length of the drum in a predetermined time, and means for discharging the vegetables and water from the drum at the end of said time.

9. An apparatus for cooking vegetables comprising a rotating drum having an extended shallow body of water therein, spiral fins in said drums creating a spiral passageway, and means for feeding hot water and means for introducing vegetables into the rear end of said drum and spiral passageway whereby rotation of the drum will cause said fins to move the water and the vegetables along the bottom of the drum to the discharge end thereof.

10. An apparatus for cooking vegetables comprising a rotating drum having an extended shallow body of water therein, spiral fins in said drums creating a spiral passageway, means for feeding hot water and means for introducing vegetables into the rear end of said drum and spiral passageway whereby rotation of the drum will cause said fins to move the water and the vegetables along the bottom of the drum to the discharge end thereof, and means at said discharge end for discharging water and vegetables from the drum.

11. An apparatus for cooking vegetables comprising a rotating drum, spiral fins in said drum creating a spiral passageway, means for feeding hot water and means for introducing vegetables into the rear end of said drum and spiral passageway, and means for rotating the drum at a rate such that the action of the spiral fins will move the water and vegetables to the discharge end of the drum in a predetermined time sufficient to effect cooking of the vegetables.

12. An apparatus for cooking vegetables comprising a rotating drum, spiral fins in said drum creating a spiral passageway, means for feeding hot water and means for introducing vegetables into the rear end of said drum and spiral passageway, means for rotating the drum at a rate such that the action of the spiral fins will move the water and vegetables to the discharge end of the drum in a predetermined time sufficient to effect cooking of the vegetables, and means for varying said rate of rotation correspondingly to vary the rate of feed through the drum for cooking different kinds of vegetables.

13. An apparatus for cooking vegetables comprising a rotating drum with an extended shallow body of water therein, a chute for introducing vegetables, a pipe for introducing hot water and a pipe for introducing live steam at or near the same point in the rear end of said drum and body of water, and means in said rotating drum for causing the vegetables and water to move through the drum in a predetermined period of time.

14. An apparatus for cooking vegetables comprising a rotating drum with an extended shallow body of hot water therein, a chute for introducing vegetables and a pipe for introducing hot water at or near the same point in the rear end of said drum, means in said rotating drum for causing the vegetables and water to move through the drum in a predetermined period of time, and means for discharging said vegetables and water, said discharging means being adjustable to vary the rate of discharge and proportion the same to the amount of vegetables in and passing through said drum.

15. An apparatus for cooking vegetables comprising a rotating drum having an extended shallow body of water therein, means for introducing vegetables into the drum, means for causing the vegetables to move along the drum in the body of water to the discharge end of the drum, and means for introducing live steam into the water in the drum at various points upon or adjacent the vegetables in said water.

16. An apparatus for cooking vegetables comprising a rotating drum, means for introducing vegetables into the drum at one end thereof, means for causing the vegetables to move along the bottom of the drum in an extended shallow body or sheet to the discharge end of the drum, and means for causing blasts of live steam under pressure to impact upon and into said vegetables at numerous points along the extent of said body of vegetables.

17. An apparatus for cooking vegetables comprising a rotating drum, means for introducing vegetables into the drum at one end thereof, means for causing the vegetables to move along the bottom of the drum in an extended shallow body or sheet to the discharge end of the drum, means for causing blasts of live steam under pressure to impact upon and into said vegetables at numerous points along the extent of said body of vegetables, and means for regulating the discharge pressure of said steam.

18. An apparatus for cooking vegetables comprising a rotating drum, means for introducing vegetables into the drum, means for causing the vegetables to move along the drum in an extended body or sheet to the discharge end thereof, a steam pipe fixedly supported within the drum having connection with a source of steam supply under pressure, and leads from said steam pipe for introducing pressure steam directly into the body of vegetables.

19. An apparatus for cooking vegetables comprising a rotating drum, means for introducing vegetables into the drum, means for causing the vegetables to move along the drum in an extended body or sheet to the discharge end thereof, a steam pipe fixedly supported within the drum having connection with a source of steam supply under pressure, and nozzles extending from said steam pipe for directing blasts of steam under pressure to impact upon said sheet of vegetables.

20. An apparatus for cooking vegetables comprising a rotating drum, means for introducing vegetables into the drum, means for causing the vegetables to move along the drum in an extended body or sheet to the discharge end thereof, a steam pipe fixedly supported within the drum having connection with a source of steam supply under pressure, and nozzles extending from said steam pipe for directing blasts of steam under pressure to impact upon said sheet of vegetables, said nozzles being angularly disposed from the vertical in the direction of movement upwardly of said body of vegetables as the drum is rotated.

In testimony whereof I hereunto affix my signature.

EDWARD J. VAUDREUIL.